US009424477B2

(12) United States Patent
Shibata et al.

(10) Patent No.: US 9,424,477 B2
(45) Date of Patent: Aug. 23, 2016

(54) HANDWRITTEN CHARACTER RETRIEVAL APPARATUS AND METHOD

(71) Applicant: Kabushiki Kaisha Toshiba, Tokyo (JP)

(72) Inventors: Tomoyuki Shibata, Kawasaki (JP); Yojiro Tonouchi, Inagi (JP); Kazunori Imoto, Kawasaki (JP); Yasunobu Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 13/841,767

(22) Filed: Mar. 15, 2013

(65) Prior Publication Data

US 2013/0315484 A1    Nov. 28, 2013

(30) Foreign Application Priority Data

May 28, 2012  (JP) ................ 2012-121304

(51) Int. Cl.
*G06K 9/00* (2006.01)
(52) U.S. Cl.
CPC ....... *G06K 9/00865* (2013.01); *G06K 9/00469* (2013.01)
(58) Field of Classification Search
None
See application file for complete search history.

(56) References Cited

U.S. PATENT DOCUMENTS

| | | | |
|---|---|---|---|
| 6,108,444 A * | 8/2000 | Syeda-Mahmood | ......... 382/186 |
| 6,130,962 A | 10/2000 | Sakurai | |
| 6,373,473 B1 | 4/2002 | Sakaguchi et al. | |
| 7,302,099 B2 * | 11/2007 | Zhang et al. | ................. 382/186 |
| 2005/0152601 A1 * | 7/2005 | Chen | ................... G06K 9/6807 |
| | | | 382/187 |

FOREIGN PATENT DOCUMENTS

| | | |
|---|---|---|
| CN | 101299236 A | 11/2008 |
| JP | 08-077295 A | 3/1996 |
| JP | 09-091424 A | 4/1997 |
| JP | 11-053402 A | 2/1999 |
| WO | WO2012024829 A1 * | 3/2012 |

OTHER PUBLICATIONS

Yann Leydier, Asma Ouji, Frank LeBourgeois, and Hubert Emptoz. Towards an omnilingual word retrieval system for ancient manuscripts. Pattern Recognition, 42(9):2089-2105, Sep. 2009.*
T.M Rath, R. Manmatha, and V. Lavrenko. A search engine for historical manuscript images. In Proceedings of the 27th annual international ACM SIGIR conference on research and development in information retrieval, pp. 369-376. ACM, 2004.*

(Continued)

*Primary Examiner* — Nirav G Patel
*Assistant Examiner* — Menatoallah Youssef
(74) *Attorney, Agent, or Firm* — Knobbe, Martens, Olson & Bear, LLP

(57) ABSTRACT

According to one embodiment, a handwritten character retrieval apparatus is provided with an acquisition unit, a feature extraction unit, an segmentation unit, a attribute append unit and a retrieval unit. The acquisition unit acquires a handwritten character string in units of a stroke. The feature extraction unit extracts a first feature value unique to each of the strokes from the handwritten character string. The segmentation unit segments the strokes into a plurality of sets. The attribute append unit appends a second feature value based on the sets to each of the strokes. The retrieval unit executes retrieval based on the first feature value and the second feature value.

14 Claims, 10 Drawing Sheets

(56) References Cited

OTHER PUBLICATIONS

Japanese Office Action for Patent Application No. 2012-121304, mailed Jul. 8, 2014, 7 pages including translation.
C. Cheng et. At., "A Discriminative Model for On-line Handw;ritten Japanese Text Retrieval", International Conference on Document Analysis and Recognition, 2011.
P. Luangvilay, et al., "An On-line Handwritten Text Search Method based on Directional Feature Matching", International Conference on Document Analysis and Recognition, 2011, pp. 683-686.
X.-D. Zhou, et al., "Online Handwritten Japanese Character String Recognition Using Conditional Random Fields," 2009 10$^{th}$ International Conference on Document Analysis and Recognition, pp. 521-525.
K. Imamura, et al., "A Method of Dividing Peaks in Histograms Based on Weighted Sequential Fuzzy Clustering", The Journal of the Institute of Image Information and Television Engineers, vol. 61, No. 4, pp. 550-554, 2007.
X. -D. Zhou, et al., "Text/Non-text Ink Stroke Classification in Japanese Handwriting Based on Markov Random Fields", Ninth International Conference on Document Analysis and Recognition pp. 1-5.
Y. Masuda, et al., "Experimental Optimization of DP Matching in Online Character Recognition", Denki Kankei Gakkai Kyusu-shibu Rengo Taikai, H. 17(2005).
Background Art Information (Concise Explanation for NPL 1-3, 5 & 6), Toshiba, Jul. 11, 2012 & Jul. 12, 2012.
First Office Action dated Jan. 29, 2016 in corresponding Chinese Patent Application No. 2012103482191, 17 pgs.
Notification of Reasons for Refusal dated Feb. 25, 2016 in corresponding JP Application No. 2015-050012, 16 pgs.
Notification of Reasons for Refusal dated Mar. 1, 2016 in corresponding JP Application No. 2015-050012, 16 pgs.
Hirose, Katsumasa, et al., "Media Conversion for Document Images Based on Layout Analysis and Character Recognition", Institute of Scientific and Industrial Research, Osaka University, Feb. 21, 2000, vol. 99, No. 648, 10 pgs.

* cited by examiner

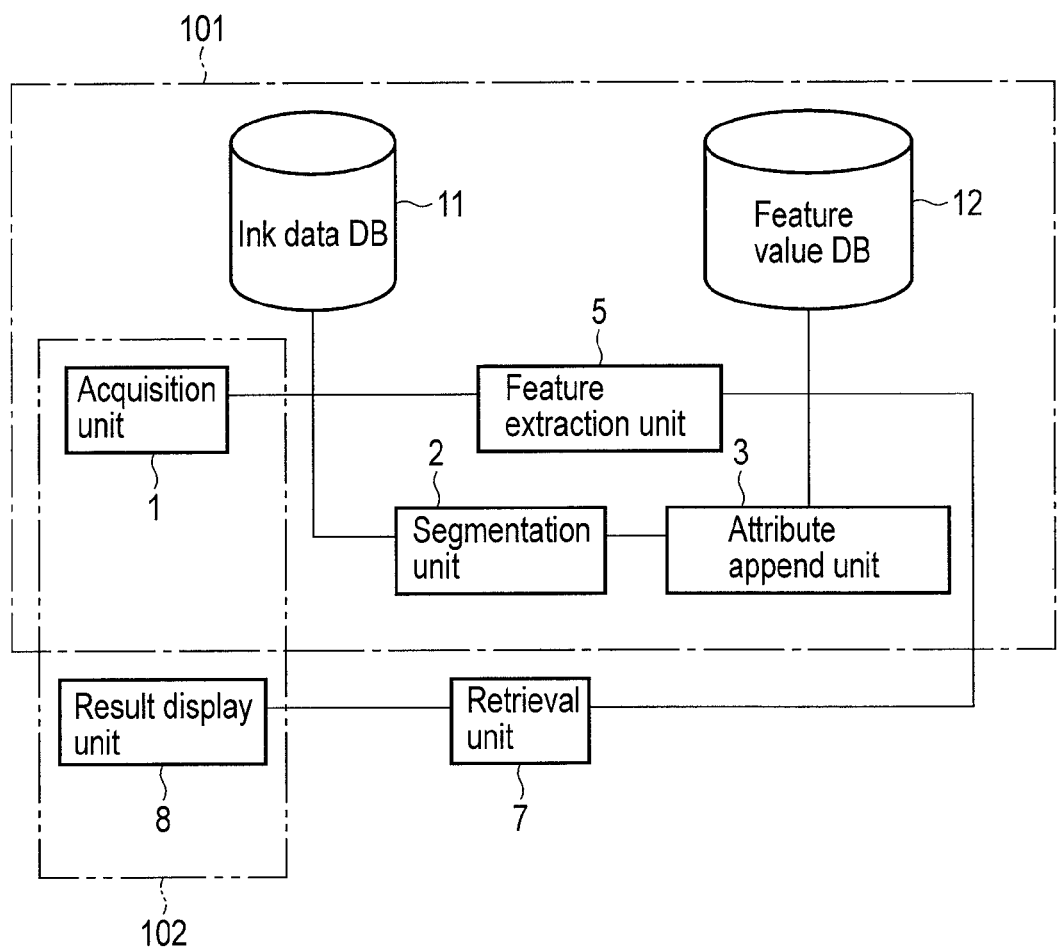
F I G. 1

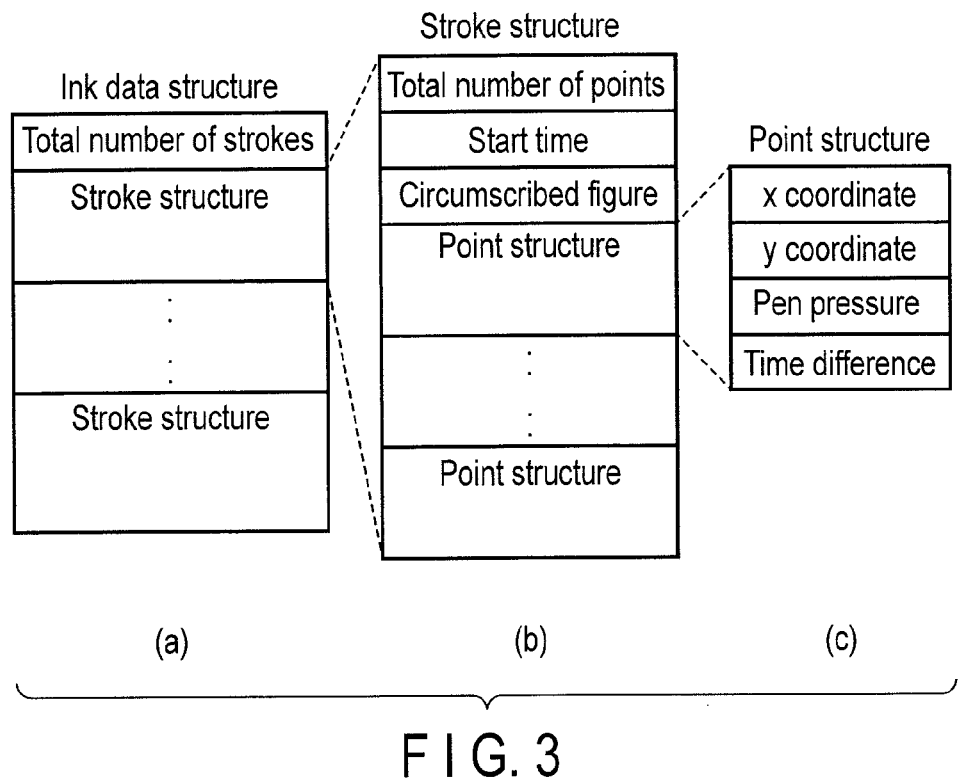
F I G. 3
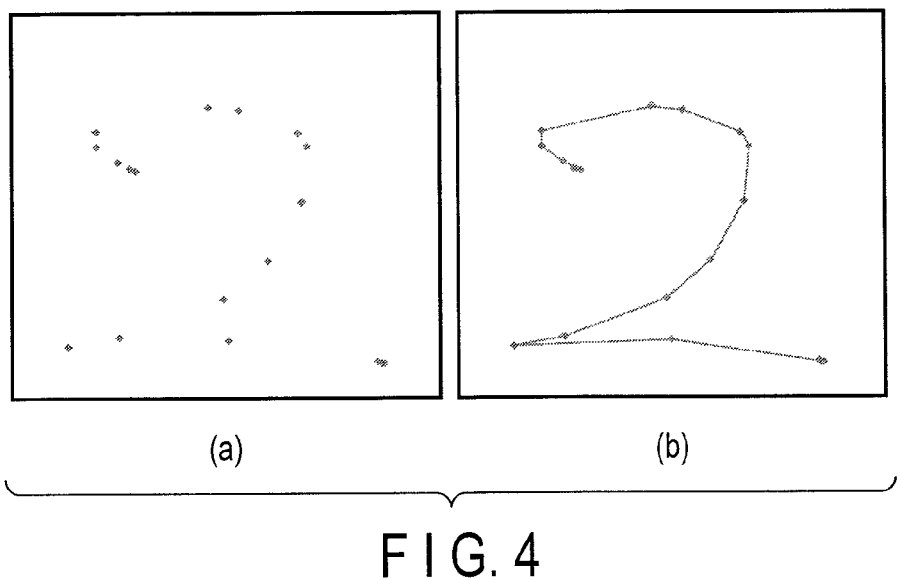
F I G. 4

(a)  (b)

| Feature value unique to stroke | Feature value by set of strokes | | | | | | | |
|---|---|---|---|---|---|---|---|---|
| | Graphic area | Table area | Character area | Paragraph | Line | Word | Character | Radical |
| | | | | | | | | |

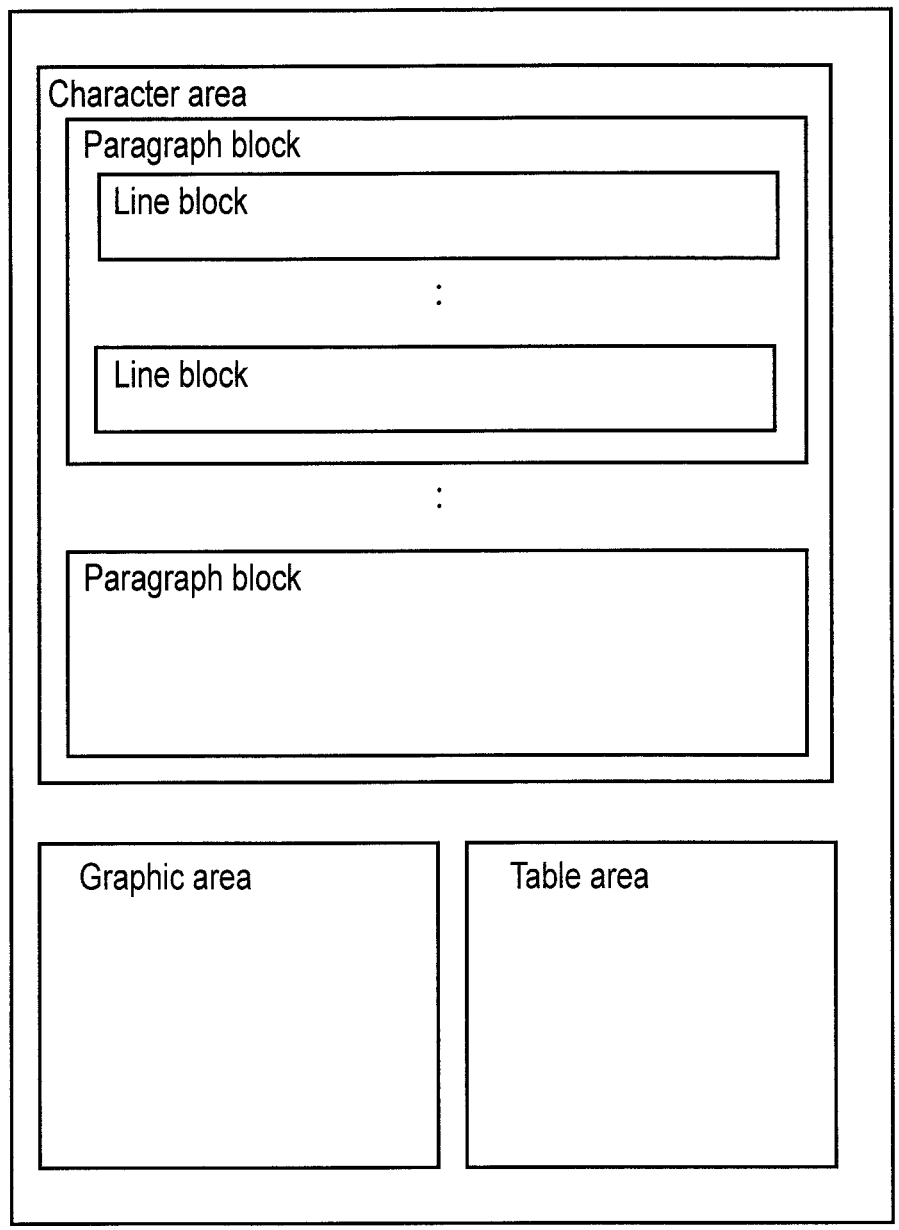
F I G. 7

| Stroke | Total number of strokes of character block |
|---|---|
| 1 | 3 |
| – | 3 |
| 2 | 3 |

(b)

| Stroke | Total number of strokes of character block |
|---|---|
| 1 | 1 |
| – | 1 |
| 2 | 1 |

HANDWRITTEN CHARACTER RETRIEVAL APPARATUS AND METHOD

CROSS-REFERENCE TO RELATED APPLICATIONS

This application is based upon and claims the benefit of priority from Japanese Patent Application No. 2012-121304, filed May 28, 2012, the entire contents of which are incorporated herein by reference.

FIELD

Embodiments described herein relate generally to a handwritten character retrieval apparatus and method.

BACKGROUND

There is known a document retrieval apparatus for retrieving a handwritten document, which is similar to or matches with a handwritten query input or designated by a user, from a database.

BRIEF DESCRIPTION OF THE DRAWINGS

FIG. 1 is a block diagram showing a handwritten character retrieval apparatus according to an embodiment.

FIG. 3 is a view illustrating an example of a format of ink data.

FIG. 4 is an exemplary view for illustrating the input of stroke data.

FIG. 7 is an exemplary view for illustrating the segmentation of stroke data.

FIG. 12 is an exemplary view for illustrating retrieval using a feature value by an area.

DETAILED DESCRIPTION

Figure 2:
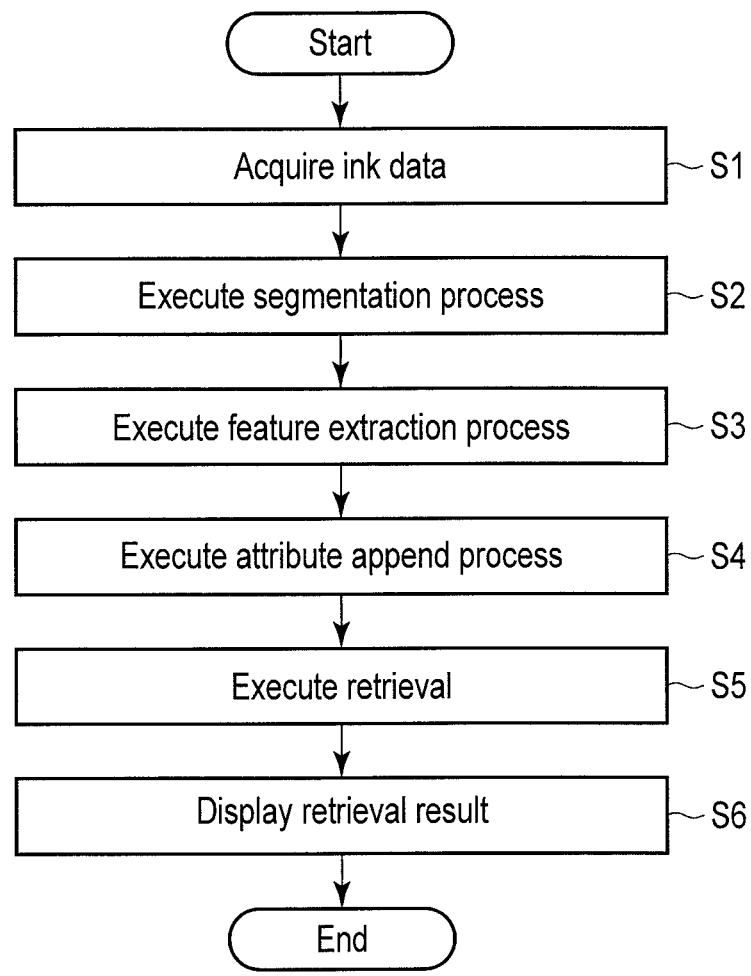
FIG. 2 is a flowchart illustrating a processing of the handwritten character retrieval apparatus.

A handwritten character retrieval apparatus according to an embodiment will now be described in detail with reference to the accompanying drawings. In the embodiment to be described below, it is assumed that components designated by the same numeral operate in the same manner, and an overlapping description is omitted.

In general, according to one embodiment, a handwritten character retrieval apparatus is provided with an acquisition unit, a feature extraction unit, a segmentation unit, an attribute append unit and a retrieval unit. The acquisition unit acquires a handwritten character string in units of each of strokes. The feature extraction unit extracts a first feature value which is unique to each of the strokes from the handwritten character string. The segmentation unit segments the strokes into a plurality of sets. The attribute append unit appends a second feature value based on the sets, to each of the strokes. The retrieval unit executes retrieval based on the first feature value and the second feature value.

According to the embodiment, handwritten character retrieval with higher accuracy is enabled.

In the embodiment, retrieval is executed from (for example, many) handwritten documents which were written in advance, by using a handwritten character string which was handwritten by a user as a query. In the embodiment, a character string is described as a principal example of the query, but the query may be one or more lines or one or more marks drawn by the user. In addition, any method may be used for the user to designate a handwritten character string. For example, the query may be designated by the user actually handwriting a character string. A part, which is to be used as the query, may be selected by the user from among existing handwritten documents. A query, which is to be used by the user, may be selected by the user from among templates for queries. A combination of these methods may be used.

In addition, in the embodiment, in the determination of the similarity between a query and a handwritten character string, use is made of a feature value based on a set of strokes, in addition to a feature value which is unique to a stroke as a single unit. Note that the stroke refers to a stroke (e.g., one pen stroke or one stroke in a Kanji character) which has been input by handwriting, and represents a locus of a pen or the like from the contact of the pen or the like with an input surface to the release thereof.

Besides, in the embodiment, it is assumed that a handwritten document including a handwritten character string, which is similar to or matches with a query, is presented as a retrieval result.

FIG. 1 illustrates an exemplary block diagram of the handwritten character retrieval apparatus according to the embodiment. As shown in FIG. 1, the handwritten character retrieval apparatus of the embodiment includes an acquisition unit 1, an segmentation unit 2, an attribute append unit 3, a feature extraction unit 5, a retrieval unit 7, a result display unit 8, an ink data database (ink data DB) 11, and a feature value database (feature value DB) 12.

The ink data DB 11 stores ink data in which strokes are segmented in units of a document.

The feature value DB 12 stores a feature value (first feature value) which is unique to each stroke as a single unit, and a feature value (second feature value) based on each set to which each stroke belongs. In this case, the set is formed of a single stroke or a plurality of strokes (hereinafter referred to as "stroke group").

The acquisition unit 1 is configured to acquire a handwritten character string which is used as a query.

The description below is mainly given of the case in which a stroke, which is written by the user, is acquired. As the method of handwriting input, use may be made of various methods, such as a method of input by a pen on a touch panel, a method of input by a finger on the touch panel, a method of input by a finger on a touch pad, a method of input by operating a mouse, and a method by an electronic pen.

A stroke group, which is written by the user, is stored as ink data in ink data DB 11, for example, when the user finishes writing a document or saves a document. The ink data is a data structure for storing a stroke group in units of a document, etc.

The feature extraction unit 5 extracts, from each stroke, a feature value (first feature value) which describes the feature (which is unique to the stroke as a single unit).

The segmentation unit 2 segments strokes into a plurality of sets with respect to ink data, and extracts segmentation information. The segmentation information is information indicative of one or plural sets to which each stroke belongs. That is, the strokes are integrated the plurality of sets and the segmentation unit 2 segments in to the predetermined category. For example, the segmentation information includes a classification label indicative of the kind of a segmented result with respect to each set, and area data indicative of the area in which the set is located. The area data is expressed by a rectangle designated by a diagonal, and a rotational angle, for example.

The attribute append unit 3 appends segmentation information (that is second feature value) obtained by the segmentation unit 2 to the feature value (first feature value) of each stroke.

The retrieval unit 7 retrieves a similar character string based on the stored feature value using a character string constituted by a plurality of strokes as a query.

The result display unit 8 presents a retrieval result.

FIG. 2 illustrates an example of the process of the handwritten character retrieval apparatus of the embodiment.

In step S1, the acquisition unit 1 acquires a handwritten document or a handwritten character string (handwritten stroke string) which is to be used as a query.

In step S2, the segmentation unit 2 extracts segmentation information with respect to the acquired ink data (i.e. executes a segmentation process).

In step S3, the feature extraction unit 5 executes a feature extraction process with respect to the acquired ink data.

In step S4, the attribute append unit 3 executes an attribute append process on the acquired ink data, based on the result of the segmentation process by the segmentation unit 2.

In step S5, the retrieval unit 7 executes retrieval, based on the first feature value obtained by the feature extraction unit 5 and the second feature value obtained by the attribute append unit 3.

In step S6, the result display unit 8 displays the retrieval result obtained by the retrieval unit 7.

In the above-described process, step S3 can be executed at an arbitrary timing between step S1 and step S5. Similarly, steps S2 and S4 (step S4 is executed after step S2) can be executed at an arbitrary timing between step S1 and step S5. Step S3 and steps S2 and S4 may be executed in parallel. Furthermore, step S3 can be executed along with step S1.

Next, referring to FIG. 3, a description is given of the data structure of ink data and the data structure of stroke data.

Usually, a stroke is sampled such that points on a locus of the stroke are sampled at a predetermined timing (e.g. at regular time intervals). Thus, the stroke is expressed by a series of sampled points.

In an example of part (b) of FIG. 3, a stroke structure of one stroke (i.e., one handwritten stroke) is expressed by a set (point structure) of coordinate values on a plane on which a pen has moved. Specifically, the stroke structure is a structure including "total number of points" indicative of the number of points constituting the stroke, "start time", "circumscribed figure", and an array of "point structures", the number of which corresponds to the total number of points. The start time indicates a time point at which the pen was put in contact with the input surface to write the stroke. The circumscribed figure indicates a circumscribed figure for a locus of the stroke on the document plane (preferably, a rectangle of a smallest area including the stroke on the document plane).

The structure of a point may depend on an input device. In an example of part (c) of FIG. 3, the structure of one point is a structure having four values, namely coordinate values x and y, at which the point was sampled, a writing pressure, and a time difference from an initial point (e.g. the above-described "start time").

The coordinates are a coordinate system on the document plane, and may be expressed by positive values which become greater toward a lower right corner, with an upper left corner being the origin.

In addition, when the input device is unable to acquire a writing pressure or when a writing pressure, even if acquired, is not used in a subsequent process, the writing pressure in part (c) of FIG. 3 may be omitted or data indicative of invalidity may be described for the writing pressure.

In the examples of parts (b) and (c) of FIG. 3, actual data, such as coordinate values x and y, may be described in area of each point structure in the stroke structure. Alternatively, assuming that the data of the stroke structure and the data of the point structure are separately managed, link information to the corresponding point structure may be described in the area of each point structure in the stroke structure.

FIG. 4 illustrates an example of a stroke which is acquired. In the description below, for example, the case is assumed that the sampling cycle of sample points in the stroke is constant. Part (a) of FIG. 4 shows coordinates of sampled points, and part (b) of FIG. 4 shows temporally successive point structures which are linearly interpolated. The difference in intervals of coordinates of sampling points is due to the difference in speed of writing. The number of sampling points may differ from stroke to stroke.

In an example of part (a) of FIG. 3, the data structure of ink data is a structure including "total number of strokes" indicative of the number of stroke structures included in the entire area of the document, and an array of "stroke structures", the number of which corresponds to the total number of strokes.

In the examples of parts (a) and (b) of FIG. 3, the data of part (b) of FIG. 3 may be described in the area of each stroke structure in the ink data structure. Alternatively, assuming that the data of the ink data structure and the data structure of the stroke of part (b) of FIG. 3 are separately managed, link information to the corresponding data of part (b) of FIG. 3 may be described in the area of the data structure of each stroke in the ink data structure.

The stroke data, which has been handwritten by the user by using the input device, is deployed on the memory, for example, by the ink data structure shown in FIG. 3. The ink data is stored as ink data DB 11, for example, when the ink data is saved as a document.

When a plurality of document are stored, document IDs for identifying these documents may be saved in association with each ink data. In addition, in order to identify each stroke, a stroke ID may be appended to each stroke structure.

Next, the feature extraction unit 5 is described.

The feature extraction unit 5 extracts, from each stroke, the feature value (first feature value) which is unique to the stroke as a single unit. In this case, since the process can be executed with only the information of the stroke as a single unit, feature extraction may be executed when stroke data has been input, in parallel with the addition to the data structure of the ink data. However, after the acquisition of ink data has been completed, first feature values may be extracted at a time.

In the meantime, the stroke data is described as a set of sampled coordinate values. However, even if the same shape is handwritten, the coordinate values, which are obtained, are different depending on the speed of writing. Thus, it is preferable to normalize the speed of writing by executing re-sampling, by which sampling is executed once again at a fixed number of sampling points.

For example, in this re-sampling process, it is assumed that the stroke length is re-sampled at regular intervals at a fixed number N of sampling points, and each coordinate value is calculated by linear interpolation based on two adjacent points of original sampling points. In this case, re-sampling is executed with N=128. Parts (a) and (b) of FIG. 5 show data before and after re-sampling, respectively.

Various feature values are usable as the feature value which is unique to a stroke as a single unit.

Next, an example of the feature value is described.

Figures 5, 6:
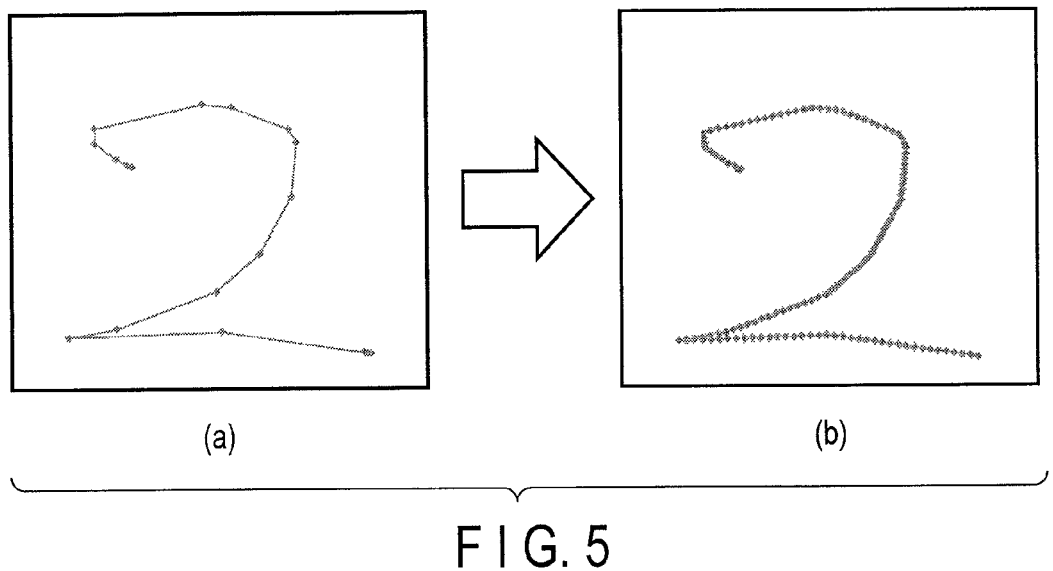
FIG. 5 is an exemplary view for illustrating the sampling of stroke data.
FIG. 6 is a view for illustrating an example of a feature value database.

To begin with, with respect to the stroke data after re-sampling as shown in part (b) of FIG. 5, an area (stroke area) of a stroke group is set by a square which has the length of one side corresponding to a long side of a circumscribed rectangle. At this time, the center of the circumscribed rectangle is located at the center of the stroke area. The center of the stroke area is, for example, a position obtained by averaging coordinates of a plurality of points. Then, the stroke area is equally divided into S with respect to an x direction and a y direction, and $S^2$ local areas are obtained. In this case, S is a parameter of the number of division, and should preferably be an odd number. As a concrete example, S is set at S=7 (in this case, the area of part (b) of FIG. 5 is divided into 7 parts in the vertical and horizontal directions, respectively).

Next, as regards all re-sampled coordinate values $\vec{r}(i)$, the direction of gradient, direction (i), is calculated.

$$grad_x(i) = r_x(i+1) - r_x(i-1)$$
$$grad_y(i) = r_y(i+1) - r_y(i-1)$$
$$\text{direction}(i) = \arctan\left(\frac{grad_x(i)}{grad_y(i)}\right) + \pi$$

where $\vec{grad}(i)$ is a differential vector at the coordinate value $\vec{r}(i)$.

The calculated direction of gradient is quantized to the fixed number D, and a histogram $\vec{Hist}_l$ of the direction of gradient at each local area is calculated.

$$Hist_l(\text{bin}) = \sum_{bin=0}^{D-1} \sum_{i=2}^{N-1} \delta\left(\text{floor}\left(\frac{\text{direction}(i)*D}{2\pi}\right), \text{bin}\right)$$

In the case of S=7 as a concrete example, histograms are obtained with respect to 49 local areas in total.

In this case, floor ( ) means a floor function. $\delta(i, j)$ is such a function that 1 is returned when i and j coincide, and 0 is returned in other cases. D is a parameter indicative of a classification number (quantization number) of the direction of gradient of 360° ($2\pi$ radian), and should preferably be an even number. As a concrete example, D is set at D=16 (in this case, the direction of gradient is classified into 16 kinds).

Next, in order to obtain robustness against orthographic variation of a stroke, values of neighboring positions are averaged and smoothed with respect to the quantized direction of gradient (e.g. D=16) and local areas (e.g. $S^2$=49).

To begin with, down-sampling is executed to D' by using a Gaussian filter with respect to the direction of gradient. For example, D'=D/2.

When D'=D/2 and D=16 as a concrete example, D'=D/2=8. In this case, the classification number (quantization number) of the direction of gradient changes from 16 to 8.

An example of the Gaussian filter relating to the direction of gradient is shown below.

$$Hist'_l(bin') = \frac{Hist_l(2bin'-1) + 2Hist_l(2bin') + Hist_l(2bin'+1)}{4}$$

Since the direction of gradient can be expressed by a periodic function, when bin' is D/2, $Hist_l(0)$ is used for the third term in the above equation.

Subsequently, using the histogram Hist' in which the direction of gradient is smoothed as described above, smoothing is further executed between neighboring local areas, and Hist" is calculated. Like the direction of gradient, the Gaussian filter is used to execute down-sampling to S' in the x direction and y direction, respectively. For example, S'=(S-1)/2.

When S'=(S-1)/2 and S=7 as a concrete example, S'=(S-1)/2=3. In this case, down-sampling is executed to 3 in the x direction and y direction, respectively (i.e. the number of local areas changes from 49 to 9).

An example of the Gaussian filter relating to the local areas is shown below.

$$Hist''_l(x', y') = \\ \{(Hist'_l(2x'-1, 2y'-1) + 2Hist'_l(2x', 2y'-1) + Hist'_l(2x'+1, 2y'-1) + \\ 2Hist'_l(2x'-1, 2y') + 4Hist'_l(2x', 2y') + \\ 2Hist'_l(2x'+1, 2y') + Hist'_l(2x'-1, 2y'+1) + \\ 2Hist'_l(2x', 2y'+1) + Hist'_l(2x'+1, 2y'+1)\}/16$$

In the above-described manner, the histogram $Hist''_l(x',y')$ of the D' dimensions is obtained with respect to each of the S'×S' local areas.

At last, the obtained histograms $Hist''_l(x',y')$ are raster-scanned and arranged as one vector, and the vector is output as the feature value of the dimensions of the stroke. Specifically, the feature value vector of the S'×S'×D' dimensions is obtained as the first feature value.

In the case of the above concrete example, the feature value vector of the 3×3×8=72 dimensions is obtained.

The feature value, which has been extracted by the feature extraction unit 5 as described above, is stored in the feature value DB 12 as "feature value unique to stroke".

FIG. 6 shows an example of the content of the feature value DB 12 for the stroke as a single unit. The feature value DB 12 stores the feature value unique to the stroke as a single unit and the feature value (second feature value) based on the set of strokes. The "feature value (second feature value) based on the set of strokes", for example, the classification of graphic area, a table area and a character area, will be described later.

The individual strokes stored in the ink data DB 11 and the feature values of the individual strokes stored in the feature value DB 12 may be associated, for example, by stroke IDs. Alternatively, link information to feature values may be described in the ink data DB 11 (e.g. in each of stroke structures in part (b) of FIG. 3). Alternatively, the feature value may be described in the ink data DB 11 (e.g. in each of stroke structures in part (b) of FIG. 3), thereby to store the ink data DB 11 and feature value DB 12 as one database.

Next, the segmentation unit 2 is described.

The segmentation unit 2 executes a segmentation process of segmenting the stored ink data into a plurality of sets, based on the positional relationship and attributes of strokes on the document plane.

When strokes are segmented with respect to the ink data, the strokes are segmented into some sets.

Figure 8:
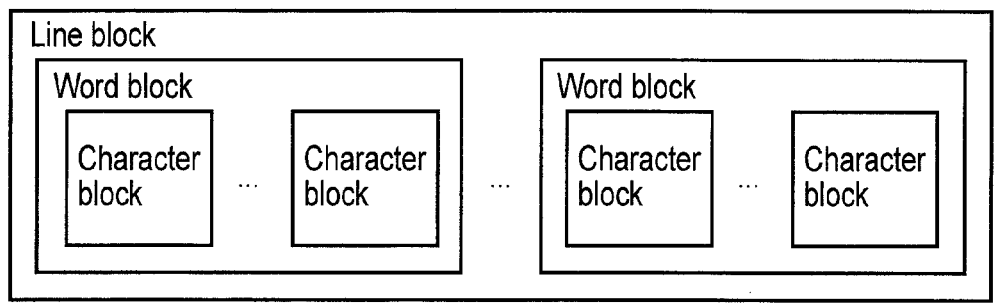
FIG. 8 is an exemplary view for illustrating the segmentation of stroke data.
Figure 9:
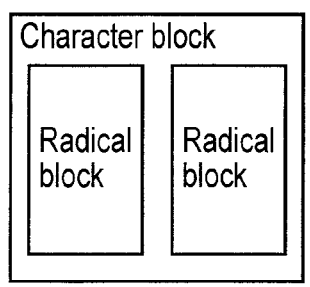
FIG. 9 is an exemplary view for illustrating the segmentation of stroke data.

Referring to FIG. 7 to FIG. 9, an example of the group of strokes is described.

Groups of strokes are classified into, for example, a character area, and an area other than the character area. Preferably, as shown in FIG. 7, stroke groups are mainly classified into three areas, namely units of "character area", "graphic area" and "table area". Further, the "character area" may have a subordinate hierarchical structure, and may include, for instance, a "paragraph block" and a "line block" which is subordinate to the "paragraph block". Furthermore, as shown in FIG. 8, the "character area" may include a "word block" which is subordinate to the "line block", and a "character block" which is subordinate to the "word block". In addition, as shown in FIG. 9, the "character area" may include a "radical block" which is subordinate to the "character block". When all of these areas are used, eight kinds of sets are present. However, it is possible to use only a part which is arbitrarily selected from among these sets.

Figures 10, 11:
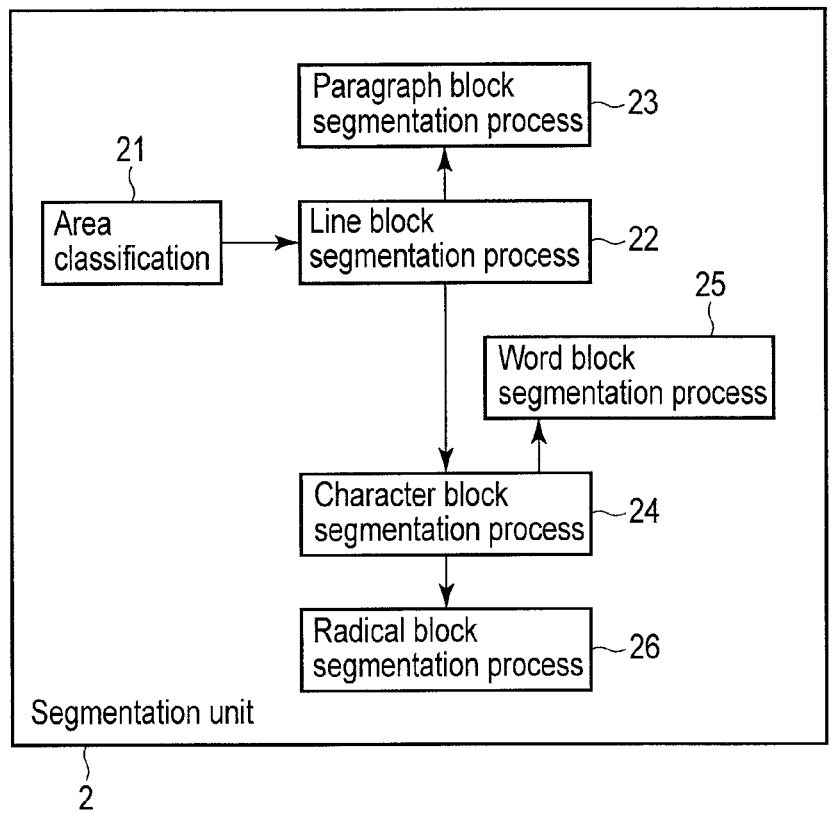
FIG. 10 is an exemplary block diagram showing an segmentation unit.
FIG. 11 is an exemplary view for illustrating retrieval using a feature value by an area.

Next, referring to FIG. 10, an example of the segmentation process is described. FIG. 10 illustrates an exemplary block diagram of internal functional blocks or internal processes of the segmentation unit 2.

To start with, attribute information of handwritten strokes is classified (segmented) into units of a character area, a graphic area and a table area (area classification unit or area classification process 21).

For example, using a discriminator which is pre-learnt to determine which of a character, a graphic and a table each of strokes belongs to, the likelihood is calculated with respect to each stroke and is expressed by Markov random field (MRF) in order to couple with spatial proximity and continuity on a document plane. By estimating an area with highest discreteness, strokes may be divided into a character area, a graphic area and a table area (see, e.g. X.-D. Zhou, C.-L. Liu, S. Ouiniou, E. Anquetil, "Text/Non-text Ink Stroke Classification in Japanese Handwriting Based on Markov Random Fields" ICDAR '07 Proceedings of the Ninth International Conference on Document Analysis and Recognition, vol. 1, pp).

The classification into the character area, graphic area and table area is not limited to the above method.

After the ink data is segmented into the character area, graphic area and table area, the character area is further segmented into detailed areas.

To begin with, in the embodiment, segmentation to an area of a line block is executed (line block segmentation unit or line block segmentation process 22).

Each stroke data includes time information indicative of a time of writing. Thus, for example, with respect to a stroke which is sorted arranged in the order of writing, if the distance between circumscribed rectangles of successive strokes is less than a threshold, these strokes may be determined to belong to the same line block. If the distance is equal to or greater than the threshold, these strokes may be determined to belong to different line blocks.

$$LineClassification(i) = \begin{cases} \text{true,} & \text{if } Dist(SR_{i-1}, SR_i) < threshold_{line} \\ \text{false,} & \text{otherwise} \end{cases}$$

The above equation is a function for determining whether an i-th stroke belongs to the same line as an immediately preceding stroke. $SR_i$ indicates the circumscribed rectangle of a stroke, and Dist (r1, r2) is a function for returning a distance between circumscribed rectangles r1 and r2. In this case, the distance between circumscribed rectangles is an Euclidean distance between gravity points of circumscribed rectangles. In addition, the threshold $threshold_{line}$ is a predetermined parameter, and varies in relation to the range of a document plane on which writing is possible. It should suffice if it is understood that the range in the x-axis direction of stroke position data of a character string or the like has greatly varied, and the threshold may be set at, e.g. 30% of the range of the x axis of target ink data.

In the meantime, a line area is not necessarily written in parallel to the axis. Thus, in order to absorb the rotation of writing, the direction of the line area may be normalized to one of three directions, namely a leftward direction, a downward direction and a rightward direction. On the document plane, a first principal component is found by principal component analysis of a line block, and the eigenvector thereof is compared to the above-described three directions, and the line block is rotated to the closest direction of the three directions. Note that when the language of writing can be specified, the direction of normalization can be limited. For example, in the case of Arabic, the direction of the line area is limited to the leftward direction. In the case of Japanese, the direction of the line area is limited to two directions, i.e. the rightward direction and downward direction.

The segmentation of the line block is not limited to the above method.

Next, segmentation to the area of the paragraph block is executed (paragraph block segmentation unit or paragraph block segmentation process 23).

For example, on the document plane, all strokes are projected with respect to the direction of the short side of the area of the line block, thereby obtaining a histogram in which the frequency of strokes in a fixed range is calculated. The obtained histogram has a multimodality, and each peak is segmented as one paragraph block. Since the total of peaks is unknown, clustering is executed by using the condensability of frequency and the distance on the axis of projection, and thereby peaks of multimodality can be divided (see, e.g. Imamura, Fujimura, Kuroda, "A Method of Dividing Peaks in Histograms Based on Weighted Sequential Fuzzy Clustering", Journal of the Institute of Image Information and Television Engineers, 61(4), pp. 550-554, 2007).

The segmentation of the paragraph block is not limited to the above method.

Next, segmentation to the area of the character block is executed (character block segmentation unit or character block segmentation process 24).

For example, a median of the short side of the circumscribed rectangle of the area of the line, which has been segmented by the above-described method, is set to be the size of one character, and segmentation is executed for each line area. An AND process of circumscribed rectangles of strokes is executed in the order of writing, and a coupled rectangle is obtained. At this time, if the coupled rectangle is larger than the character size in the long-side direction of the line structure, a target stroke may be determined to belong to the area of a character block which is different from a character block of an immediately preceding stroke. Otherwise, the target stroke may be determined to belong to the same character block.

The segmentation of the character block is not limited to the above method.

Next, segmentation to the area of the word block is executed (word block segmentation unit or word block segmentation process 25).

The "word" in this context refers to, for example, not a word which is divided by parts of speech by morphological analysis, but an area which is more detailed than a line block and is broader than a character block. Since character recognition is indispensable for exact segmentation of a word, the word block does not necessarily become a word having a meaning as text information. The area of the word block may be calculated, for example, such that for the area of the line block, the character block areas belonging to the area of the line block are clustered with respect to the coordinate values of the circumscribed rectangle for the area of the character block and are classified into a k-number of clusters, and each cluster is determined to be the area of the word block.

The segmentation of the word block is not limited to the above method.

Next, in the case where one character is constituted by a plurality of strokes of a Chinese character or the like, segmentation to the radical block is executed for segmentation to a more detailed area (radical block segmentation unit or radical block segmentation process 26).

With respect to the character block structure which has been segmented by the above method, the same process as for the character block segmentation by the threshold is executed.

The segmentation of the radical block is not limited to the above-described method.

In the above-described process example, the segmentation of the paragraph block and the segmentation of the character block/word block/radical block can be executed independently (these segmentations can be executed in an order different from the above-described one, or may be executed in parallel). In addition, the segmentation of the word block and the segmentation of the radical block can be executed independently (these segmentations can be executed in an order different from the above-described one, or may be executed in parallel).

Next, the attribute append unit 3 is described.

The individual strokes belong to one or plural sets which have been extracted as described above.

The attribute append unit 3 finds the total number of strokes belonging to each of sets to which individual strokes belong, and adds the total number as a second feature value to the feature value (first feature value) unique to each stroke as a single unit, which has been extracted by the feature extraction unit 5 and stored in the feature value DB 12. The number of dimensions of the second feature value that is added is the number of units which are segmented, and the number of dimensions is, for example, eight when all of the above-described methods are used.

FIG. 6 illustrates an example of the feature value (feature value vector) of each stroke in this case. Specifically, when the stroke belongs to the graphic area, the total number of strokes belonging to this graphic area is described in the field of the graphic area in FIG. 6. When the stroke belongs to the table area, the total number of strokes belonging to this table area is described in the field of the table area in FIG. 6. When the stroke belongs to the character area, the total number of strokes belonging to this character area is described in the field of the character area in FIG. 6. Further, when the stroke belongs to the character area, the total numbers of strokes belonging to the paragraph block, line block, word block, character block and radical block, to which the stroke belongs, are described in the associated fields in FIG. 6.

In order to adjust the weight between the first feature value (e.g. the feature vectors of 3×3×8=72 dimensions) and the second feature value (e.g. the feature vectors of 8 dimensions), these may be coupled after normalizing the respective vector lengths to 1. In addition, when priority is placed on any one of the feature values, this is realized by varying the vector lengths which are normalized.

A description will now be given with use of a concrete example of FIG. 11 and FIG. 12.

For example, when only the first feature value is used, there is a case in which stroke strings, which are to be normally discriminated, cannot be discriminated. For instance, when segmentation information is not used (i.e. when only the first feature value is used), the similarity between a stroke string (½) shown in part (a) of FIG. 11 and a stroke string (1 minus 2) shown in part (b) of FIG. 11 has a value of about 1, and these stroke strings cannot be discriminated.

Assume now that the number of strokes of at least the character block is added as the second feature value by the attribute append unit 3. In this case, in part (a) of FIG. 11, for example, by the segmentation, it is determined that "1", "−" and "2" constitute one character block. As shown in part (a) of FIG. 12, three strokes are described as "total number of strokes of character block" of "1", "−" and "2", respectively. On the other hand, as regards the stroke string (1 minus 2) shown in part (b) of FIG. 11, for example, by the segmentation, it is determined that "1", "−" and "2" do not constitute one character block (i.e. each of "1", "−" and "2" constitutes one character block). As shown in part (b) of FIG. 12, one stroke is described as "total number of strokes of character block" of "1", "−" and "2", respectively. Thus, in this case, by the second feature value, the stroke string (½) shown in part (a) of FIG. 11 and the stroke string (1 minus 2) shown in part (b) of FIG. 11 can be discriminated.

The above description has been given of the case in which the total number of strokes included in the set, to which each stroke belongs, is added as the second feature value. However, it is possible to use, as the feature value using the set, another feature value in place of the above-described feature value or in addition to the above-described feature value.

For example, with respect to each stroke, the feature value that is to be added can be calculated by applying the same calculation method as the calculation method of the first feature value to all the strokes included in the set to which each stroke belongs.

Next, the retrieval unit 7 is described.

The retrieval unit 7 retrieves a stroke string which is similar to a stroke string that is constituted by a plurality of strokes designated by the user, for example, by using the feature value (feature vector) extracted by the above-described method.

Various methods can be used for matching between a plurality of feature vector strings.

For instance, DP (Dynamic Programming) matching may be used. Similarly, as regards the similarity between feature vectors, various methods can be used. For example, normalized cross-correlation may be used. Note that it is possible that the number of strokes of a stroke string designated by user is not necessarily equal to the number of strokes of a stroke string desired by the user. The reason is that, for example, a writer may write two strokes of the same character by one stroke, and character strings having the same meaning may be written by different numbers of strokes by different writers. Usually, the DP matching relating to strokes is a method in which only the correspondence between one stroke and one stroke is handled, and optimal associating between two stroke strings executed with extension/contraction being tolerated. In the present case, for example, by using DP matching in which correspondence between one stroke and N strokes is also taken into account, matching which has robustness against a variation in strokes can be executed (see, e.g. Masuda, Uchida, Sakoe, "Experimental Optimization of DP Matching in Online Character Recognition", Denki Kankei Gakkai Kyushu-shibu Rengo Taikai, H.17, http://human.ait.kyushu-u.ac.jp/~uchida/Papers/masuda-shibu2005.pdf).

In this case, for example, all strokes included in a stroke string which is a target of matching are used as beginning points, and are associated with a stroke string that is a query designated by the user, and thereafter the similarity between stroke strings is calculated. Then, after the similarity from each beginning point is calculated, sorting is executed in a descending order. Since all strokes are used as beginning points, an overlapping result is obtained. Subsequently, peak detection is executed, and the range of overlapping strokes is segmented.

Aside from the above, various matching methods can be used.

When the retrieval unit 7 provides a retrieval result to the result display unit 8, the retrieval unit 7 may output all results or may output, instead, for example, upper K results based on the similarity. Alternatively, the retrieval unit 7 may output results with degrees of similarity which are a threshold or more, or may output K results at maximum with degrees of similarity which are a threshold or more. Alternatively, other methods may be used.

Next, the result display unit 8 is described.

The result display unit 8 presents the retrieval result, which has been provided from the retrieval unit 7, to the user.

Various methods can be used as the display method of the retrieval result.

Figure 13:
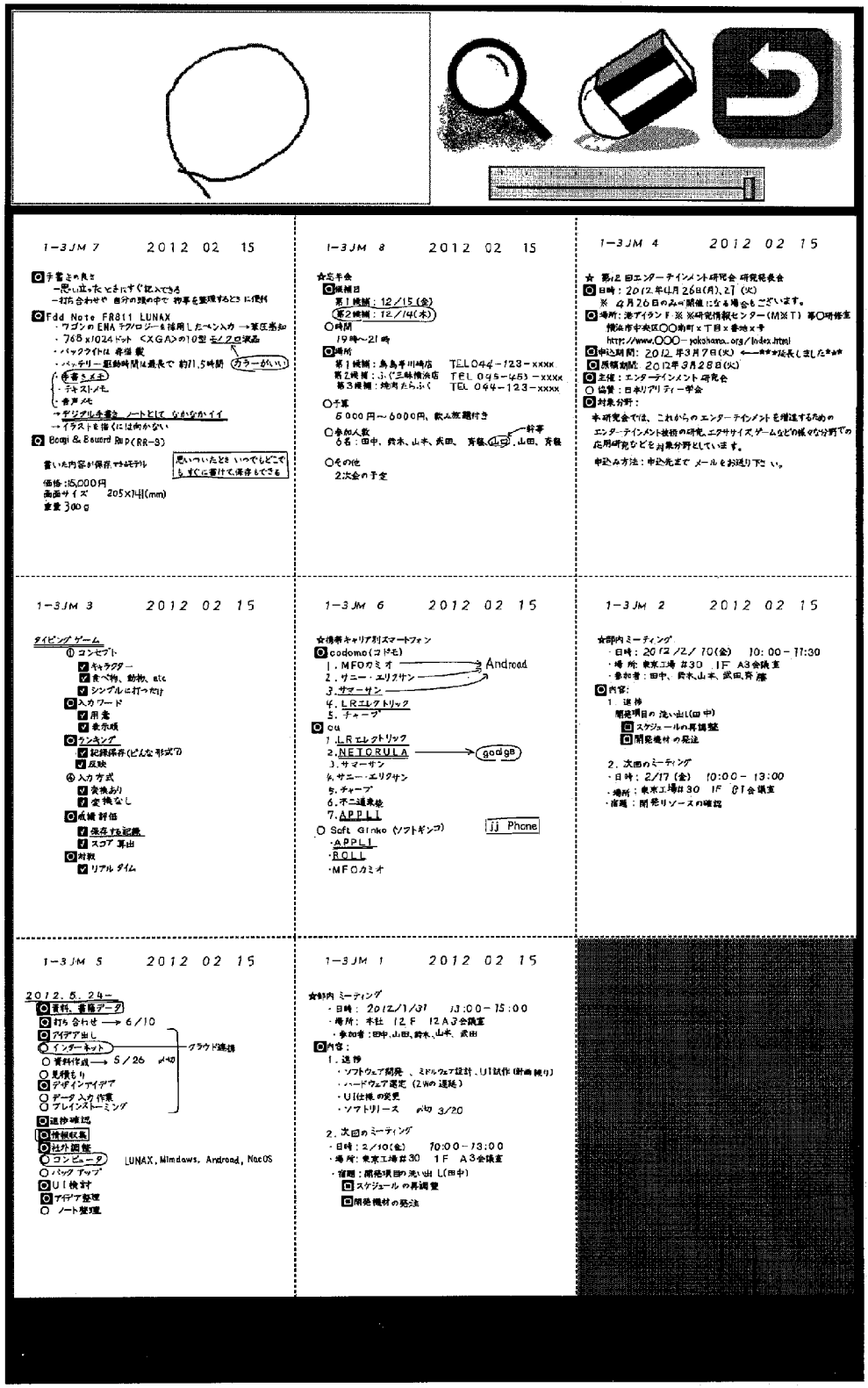
FIG. 13 is a view illustrating an example of retrieval result display.

For example, as illustrated in FIG. 13, the screen of the display device may be divided into tiles, and thumbnails of documents, which are reduced in size, may be displayed on the respective tiles.

At this time, the thumbnails of documents may be arranged, for example, in a display order beginning with one including a stroke string having a high similarity of the retrieval result.

In addition, in the thumbnail, the stroke string of the retrieval result may be displayed with emphasis.

Next, variations of the present embodiment are described.

The retrieval unit 7 of the handwritten character retrieval apparatus of the embodiment may use, as retrieval targets, handwritten documents which are stored in the handwritten character retrieval apparatus. Alternatively, when the handwritten character retrieval apparatus is connectable to a network such as an intranet and/or the Internet, the retrieval unit 7 may use, as retrieval targets, handwritten documents which can be accessed via the network. Alternatively, the retrieval unit 7 may use, as retrieval targets, handwritten documents which are stored in a removable memory that is connected to the handwritten character retrieval apparatus. Besides, retrieval targets may be an arbitrary combination of these handwritten documents. It is desirable that as regards these handwritten documents, at least the same feature values as the feature values, which are used in the retrieval in the embodiment, are associated and stored.

The handwritten character retrieval apparatus of the embodiment may be configured as a stand-alone apparatus, or may be configured such that the handwritten character retrieval apparatus is distributed to a plurality of nodes which are communicable via a network.

The handwritten character retrieval apparatus of the embodiment can be realized by various devices, such as a desktop or laptop general-purpose computer, a portable general-purpose computer, other portable information devices, an information device with a touch panel, a smartphone, or other information processing apparatuses.

Figure 14:
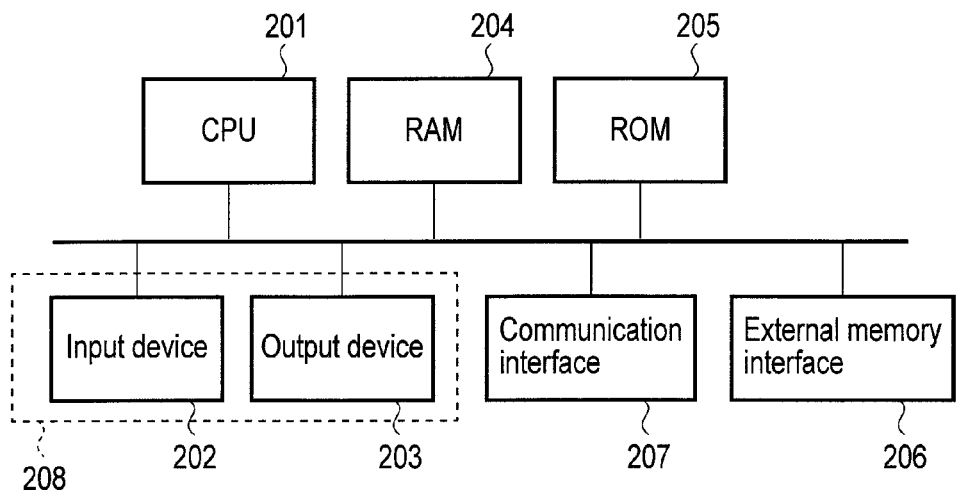
FIG. 14 is an exemplary block diagram showing a hardware configuration.

FIG. 14 illustrates an exemplary block diagram of the hardware which realizes the handwritten character retrieval apparatus of the embodiment. In FIG. 14, numeral 201 is a CPU, 202 is an appropriate input device, 203 is an appropriate output device, 204 is a RAM, 205 is a ROM, 206 is an external memory interface, and 207 is a communication interface. For example, when a touch panel is used, use is made of, for instance, a liquid crystal panel, a pen, and a stroke detector which is provided on the liquid crystal panel (see 208 in FIG. 14).

In addition, for example, a part of the structure of FIG. 1 may be provided on a client, and the other part of the structure of FIG. 1 may be provided on a server.

Figure 15:
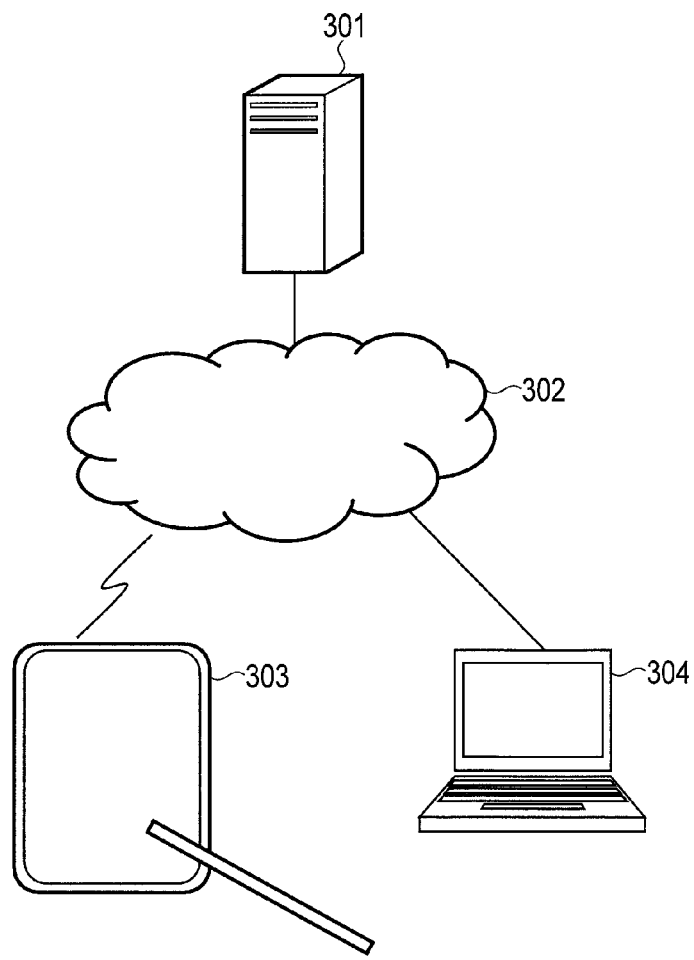
FIG. 15 is a view for illustrating an exemplary configuration in which a network is involved.

For example, FIG. 15 illustrates a state in which a server 301 exists on a network 302 such as an intranet and/or the Internet, and each client 303, 304 communicates with the server 301 via the network 302, thereby realizing the handwritten character retrieval apparatus of the embodiment.

The case is illustrated that the client 303 is connected to the network 302 by wireless communication and the client 304 is connected to the network 302 by wired communication.

Usually, the client 303, 304 is a user apparatus. The server 301 may be, for example, a server provided on a LAN such as an intra-company LAN, or a server which is operated by an Internet service provider. Besides, the server 301 may be a user apparatus by which one user provides functions to another user.

Various methods are thinkable as a method of distributing the structure of FIG. 1 to a client and a server.

For example, in FIG. 1, the range indicated by 102 may be mounted on the client side, and the other range may be mounted on the server side. Alternatively, only the retrieval unit 7 may be mounted on the server side, and the other range may be mounted on the client side.

Note that an apparatus including the range of 101 in FIG. 1, or an apparatus including a range, which excludes the acquisition unit 1 from 101 in FIG. 1, may be realized. In this case, the apparatus has a function of extracting a feature value from a stroke string. In addition, for example, the range indicated by 102 in FIG. 1 may be mounted on the client side, the retrieval unit 7 may be mounted on a first server, and the range, which excludes the acquisition unit 1 from 101, may be mounted on a second server.

Other distribution methods are also possible.

As has been described above, according to the present embodiment, handwritten character retrieval with higher accuracy can be executed. To be more specific, for example, a feature is not merely extracted from each stroke as a single unit, but also acquired stroke strings are segmented into sets such as a line block or a character block and features are also extracted from the entirety of the stroke group in the sets. By combining the features, retrieval is executed. Thereby, a greater information amount can be obtained, and therefore the retrieve capability can be enhanced.

The instructions included in the procedures in the above-described embodiments can be executed based on a program as software. Further, the same advantage as obtained by the handwritten character retrieval apparatus of the embodiments can also be obtained by beforehand storing the program in a versatile computing system and reading it. The instructions described in the above-described embodiments are recorded, as a program for causing a computer to execute them, on a recording medium, such as a magnetic disk (a flexible disk, a hard disk, etc.), an optical disk (a CD-ROM, a CD-R, a CD-RW, a DVD-ROM, a DVD±R, a DVD±RW, etc.), a semiconductor memory, or a recording medium similar to them. The recording scheme employed in the recording mediums is not limited. It is sufficient if the computer or a built-in system can read the same. If the CPU of the computer reads the program from the recording medium and executes the instructions written in the program, the same function as in the handwritten character retrieval apparatus of the embodiments can be realized. It is a matter of course that the computer acquires the program via a network.

Further, the OS (operating system) operating on the computer, database management software, middleware such as a network, etc., may execute part of each process for realizing the embodiments, based on the instructions in the program installed from a recording medium into the computer or the built-in system.

Yet further, the recording medium in the embodiments is not limited to a medium separate from the computer or the built-in system, but may be a recording medium into which a program acquired via a LAN, the Internet, etc., is stored or temporarily stored.

In addition, a plurality of mediums, from which programs are read to execute the process steps of the embodiments, may be employed.

The computer or the built-in system in the embodiments are used to execute each process step in the embodiments based on the program stored in the recording medium, and may be a personal computer or a microcomputer, or be a system including a plurality of apparatuses connected via a network.

The computer in the embodiments is not limited to the above-mentioned personal computer, but may be an operational processing apparatus incorporated in an information processing system, a microcomputer, etc. Namely, the computer is a generic name of a machine or an apparatus that can realize the functions of the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handwritten character retrieval apparatus comprising:
a processor; and
storage comprising instructions to cause the processor to execute:
    acquisition of a handwritten character string in units of each of strokes;
    feature extraction of a first feature value which is unique to each of the strokes from the handwritten character string;
    segmentation of the strokes into a plurality of sets;
    append of a second feature value based on the sets, to each of the strokes; and
    retrieval of an item including the handwriting character based on the first feature value and the second feature value;
wherein the segmentation comprises segmentation of the handwritten character string into at least one part or all of a character area, a word block, a character block and a radical block, and
classification of the handwritten character string into at least the character area and an area other than the character area,
the second feature value is a feature value vector indicative of a total number of strokes included in each of one or a plurality of sets to which each of the strokes belongs, and
the second feature value appended for each of the strokes includes at least a third feature value and a fourth feature value, the third feature value being associated with the sets to which the strokes belong if the strokes belong to the character area, the fourth feature value being associated with the sets to which the strokes belong if the strokes belong to the area other than the character area.

2. The handwritten character retrieval apparatus of claim 1, wherein the acquisition comprises acquisition of the handwritten character string in units of a stroke by online recognition.

3. The handwritten character retrieval apparatus of claim 1, wherein the acquisition comprises acquisition of one of pre-stored handwritten character strings, which is designated by a user.

4. The handwritten character retrieval apparatus of claim 1, wherein the acquisition comprises acquisition of a handwritten character string which is formed by using templates of stroke strings, which are prepared in advance in accordance with the sets.

5. The handwritten character retrieval apparatus of claim 1, further comprising a display configured to display a retrieval result by the retrieval unit.

6. The handwritten character retrieval apparatus of claim 1, wherein the retrieval comprises retrieval of a handwritten document including a stroke string which is similar to the acquired handwritten character string.

7. The handwritten character retrieval apparatus of claim 6, wherein when a retrieval result is displayed, the handwritten document including the stroke string is displayed, and the stroke string is displayed and the stroke string is highlighted.

8. A handwritten character retrieval apparatus comprising:
a processor; and storage comprising instructions to cause the processor to execute:

acquisition of a handwritten character string in units of each of strokes;

feature extraction of a first feature value which is unique to each of the strokes from the handwritten character string;

segmentation of the strokes into a plurality of sets;

append of a second feature value based on the sets, to each of the strokes; and retrieval of an item including the handwriting character based on the first feature value and the second feature value;

wherein the segmentation comprises segmentation of the handwritten character string into at least one part or all of a character area, a word block, a character block and a radical block, and classification of the handwritten character string into at least the character area and an area other than the character area, wherein the second feature value is a feature value vector indicative of a feature value that is obtained by applying a method, which is identical to a method of calculating the first feature value, to all strokes included in each of one or a plurality of sets to which each of the strokes belongs, and the second feature value appended for each of the strokes includes at least a third feature value and a fourth feature value, the third feature value being associated with the sets to which the strokes belong if the strokes belong to the character area, the fourth feature value being associated with the sets to which the strokes belong if the strokes belong to the area other than the character area.

9. The handwritten character retrieval apparatus of claim 8, wherein the acquisition comprises acquisition of the handwritten character string in units of a stroke by online recognition.

10. The handwritten character retrieval apparatus of claim 8, wherein the acquisition comprises acquisition of one of pre-stored handwritten character strings, which is designated by a user.

11. The handwritten character retrieval apparatus of claim 8, wherein the acquisition comprises acquisition of a handwritten character string which is formed by using templates of stroke strings, which are prepared in advance in accordance with the sets.

12. The handwritten character retrieval apparatus of claim 8, further comprising a display configured to display a retrieval result by the retrieval unit.

13. The handwritten character retrieval apparatus of claim 8, wherein the retrieval comprises retrieval of a handwritten document including a stroke string which is similar to the acquired handwritten character string.

14. The handwritten character retrieval apparatus of claim 13, wherein when a retrieval result is displayed, the handwritten document including the stroke string is displayed, and the stroke string is displayed and the stroke string is highlighted.

* * * * *